United States Patent [19]

Jones et al.

[11] 3,984,602

[45] Oct. 5, 1976

[54] VITREOUS AND GLASS CERAMIC BODIES

[75] Inventors: Ronald William Jones, Milton Keynes; Peter William McMillan, Shrewley, both of England

[73] Assignee: National Research Development Corporation, London, England

[22] Filed: Nov. 12, 1974

[21] Appl. No.: 523,068

[52] U.S. Cl. .............................. 428/392; 65/30 E; 65/33; 428/397; 428/400; 428/410
[51] Int. Cl.² ................. C03C 25/00; C03C 21/00; B32B 17/02
[58] Field of Search ................... 65/30, 3, 30 E, 33; 106/39.7; 117/118, 123 B, 124 A, 124 C, 125, 126 GF, 126 GM; 161/166, 169, 170, 175, 193, 196; 308/237 R, 238, DIG. 8; 428/373, 392, 397, 400, 410

[56] References Cited

UNITED STATES PATENTS

| | | | |
|---|---|---|---|
| 3,486,963 | 12/1969 | Smith | 63/30 E |
| 3,589,878 | 6/1971 | Achener | 63/33 |
| 3,647,406 | 3/1972 | Fisher | 428/410 |
| 3,776,612 | 12/1973 | Barlow | 308/237 R |
| 3,859,114 | 1/1975 | Pepper et al. | 117/126 GM |

*Primary Examiner*—Harold Ansher
*Assistant Examiner*—Charles E. Lipsey
*Attorney, Agent, or Firm*—Oblon, Fisher, Spivak, McClelland & Maier

[57] ABSTRACT

A glass ceramic body having a microcrystalline interior and a relatively amorphous outer surface layer, the composition of said layer comprising ions of at least two alkali metals the ratio of the concentrations of which ions increases from said layer to said interior.

5 Claims, No Drawings

VITREOUS AND GLASS CERAMIC BODIES

This invention relates to vitreous and glass ceramic bodies, particularly in fibre or filamentary form, and methods for the production thereof.

Glass fibre has found application for some years as a reinforcing and insulating material. When incorporated into certain low modulus metals and alloys however many of the glasses fail to substantially reduce the creep associated with these materials because of the low modulus of elasticity of the fibre. Attempts to produce an improvement in elastic modulus by devitrification of glass fibre have hitherto resulted only in fibres which are too fragile to provide satisfactory reinforcement.

We have now found that glass ceramic fibres and other bodies can be produced which have satisfactory strength properties.

According to the present invention a glass ceramic body has a microcrystalline interior and a relatively amorphous outer surface layer, the composition of said layer comprising ions of at least two alkali metals the ratios of the concentrations of which ions increases from said layer to said interior.

A glass ceramic body according to the present invention may be produced by devitrification of a vitreous body having an interior and an outer surface layer, the composition of said layer comprising ions of at least two alkali metals, in which body there is an increase in the ratio of the concentrations of said ions from said layer to said interior, the increase being effective to raise the resistance to devitrification of said layer relative to the resistance of said interior.

The present invention also includes within its scope a method for producing such glass bodies.

According to a further aspect of the present invention, a method for increasing the resistance to devitrification of the outer surface layer of a vitreous body relative to the interior thereof, comprises replacing ions of an alkali metal in said layer by ions of a different alkali metal so that the ratio of the concentration of the ions of said alkali metal to the ions of the different alkali metal in said body increases from said layer to the interior.

Vitreous bodies i.e. parent vitreous bodies, prior to surface modification, usually have a uniform composition at the surface and interior. The bodies are typically filamentary or in the form of fibres, generally with diameters no greater than 50 microns. Parent vitreous bodies may be prepared from a wide range of glass compositions, and preferably nucleate readily without requiring a heterogeneous nucleating agent. In practice compositions contain silica in addition to one or more alkali metal oxides and may also contain other substances such as phosphorus pentoxide and zinc oxide. In general one alkali metal oxide, typically lithium oxide, predominates in the composition of the vitreous bodies.

Parent vitreous bodies may be formed from a homogeneous melt of the constituent oxides, in the case of a filament or fibre, for example, by drawing the melt through a suitable bushing.

Surface modification of a parent vitreous body to produce a surface modified vitreous body according to the present invention may be effected by methods in which the surface of the parent body is treated with an alkali metal compound under conditions such that ion exchange takes place and ions of a different alkali metal at the surface of the body are replaced wholly, or preferably partly by ions of the alkali metal from the compound. In general the alkali metal which is replaced predominates in the parent vitreous body and the concentration of the latter metal relative to the concentration of the metal replacing said latter metal is reduced in the surface layer as compared with the interior of the body by said modification. Because the concentration ratio of the different alkali metal ions is closer to unity in the surface layer than in the interior said layer is relatively resistant to devitrification and is preferably not devitrifiable. Although it is preferable for only part of the alkali metal in the surface layer to be replaced, the concentration ratio of the two most significant ions in the surface layer ideally being unity (and typically within 20% of unity), total replacement is generally tolerable provided of course that the ratio increases from the surface to the interior. In the latter case there will be a region between the surface and the interior in which no alkali metal ion is predominant and which therefore resists devitrification. Although the concentration ratio of different alkali metal ions increases from the surface to the interior, the proportion of total alkali metal ions to silica remains constant.

If so desired, replacement may be effected by treating the surface of the body with a melt or a solution comprising an alkali metal compound so that ion exchange takes place, for example between lithium in the body and a potassium compound such as potassium nitrate. Where a melt is employed the body may be immersed therein. After treatment the residual alkali metal compound is washed off. It may be desirable particularly when a potassium compound is used in a melt, to include a small amount of lithium nitrate therein, to increase the rate of ion exchange. Alternatively, the body may be subjected to ion exchange treatment by an alkali metal compound e.g. potassium nitrate in the vapour phase e.g. in an inert gas such as argon. It will be appreciated that the selection of the metal which is to enter the surface of the parent vitreous body is dependent on the composition of the body.

The ion exchange treatment is generally conducted close to the annealing point (usually within 20° C) of the surface modified vitreous body although higher temperatures may be employed in some cases. In general it is undesirable for the temperature at which maximum crystal growth occurs in the final surface to be reached or undue crystallization may take place therein.

As it will be appreciated, the treatments hereinbefore described impart resistance to crystallization in the surface of the parent vitreous body so that during subsequent devitrification the interior crystallizes while the surface layer remains relatively amorphous. It is believed that the properties of the glass ceramic body result from inhibition of crystal growth from the exterior towards the interior of the body. The surface layer of modified composition is preferably made as thin as possible so that the mechanical properties of the devitrified product are not thereby affected adversely. Particularly where the body is a fibre, the layer should be preferably no thicker than 500A. It will be appreciated that after modification the surface layer is continuous with the interior of the body, there being no interface between the interior and said layer.

The composition in the surface layer is generally such that when, on devitrification, the rate of crystal growth in the interior is a maximum, the rate of crystal growth in the surface layer is at least an order of magnitude less than said maximum rate. The rate differential is usually much greater than this however, and the rate of crystal growth at the surface is preferably substantially zero. When the surface layer is 500A or less in thickness, the volume fraction of crystallinity in the microcrystalline product is preferably lower by a factor at least $10^3$ in the surface layer than in the interior.

Devitrification of a surface modified vitreous body may be effected by a two part heat treatment during the first and second stages of which nucleation and crystal growth are respectively promoted. The microcrystalline product may have a practical working strength 60% or more of the strength of the parent vitreous body. Generally the strength is at least 60,000 p.s.i. The modulus of elasticity of the product is in general greater than that of the parent vitreous body from which it is derived and is typically at least $14 \times 10^6$.

As hereinbefore indicated the glass ceramic product, particularly when in fibre or filamentary form, may be incorporated into low modulus materials such as metals and alloys, particularly in copper, aluminum, tin, lead, zinc and alloys based thereon, for example Babitts metal, to reduce the rate of creep. It is of particular interest as a reinforcing material for bearings. The vitrified product may also be employed as a reinforcement to other matrices such as polymers, ceramics, plastics, cement and gypsum plaster.

The devitrified product, when in fibre form can also be employed as an insulating material.

The invention is illustrated by the following Examples:

EXAMPLE 1

Glass-Ceramic Fibre

A glass batch of mole percentage composition 29 Li$_2$O 68 SiO$_2$ 1 ZnO 1 K$_2$O 1P$_2$O$_5$ is prepared by grinding the ingredients (reagent grade) until the mixture passes through a sieve of mesh size 36.

This batch is then fired in a platinum crucible in air at 1450° C for 4 hours. It is then poured into cold water, crushed and remelted for a further 4 hours to homogenize the glass. The glass is again poured into iced water and the product crushed. The crushed glass is then transferred to a single-tip platinum bushing, the glass is remelted and glass fibre drawn at 450 r.p.m. on to a 10 inch diameter drum. The average diameter of the fibres as measured by optical microscopy is 32 $\mu$m.

Specimens of the glass fibre are then subjected to the following heat treatments.

A. Devitrification: In order to produce glass ceramic fibres the properties of which can be compared with those of glass ceramic fibres according to the present invention, the above glass fibres are subjected to a heat treatment in air by raising the temperature to 490° C and holding at this temperature for 1 hour and then further raising the temperature to 525° C and holding for 10 hours. Thereafter the fibres are cooled at the natural cooling rate of the furnace.

B. Surface Modification and Devitrification: In order to produce glass ceramic fibres according to the present invention, the above glass fibres are subjected to a heat treatment in an atmosphere in which argon gas carries a saturated vapour of potassium nitrate over the fibres. The gas is passed over potassium nitrate which is contained in a boat and heated to 400° to 420° C. The fibres are maintained near to the potassium nitrate and maintained at a temperature close to the annealing point, which in this case is 400° C. The gas is passed over the fibres for thirty minutes at a rate of 400 liters per hour. The fibres are then subjected to the devitrifying heat treatment A. This treatment is carried out in the apparatus previously used for atmospheric treatment and the fibres are thus taken to 490° C directly after the KNO$_3$ vapour treatment and finally crystallized by treatment at 525° C. All fibres are cooled to room temperature at the natural cooling rate of the furnace. The fibres produced by treatments A and B are tested and the following results obtained.

i. Mechanical strength of glass ceramic fibres produced by treatment A is in the range 47,000 p.s.i. to 100,000 p.s.i.; the mean is 54,000 p.s.i. and standard deviation 17,500 p.s.i. (estimated on a sample of 37 fibres).

ii. Mechanical strength of glass ceramic fibres produced by treatment B is in the range 49,000 p.s.i. to 115,000 p.s.i.; the mean 87,000 p.s.i. The standard deviation is 22,000 p.s.i. (estimated on a sample of 41 fibres).

iii. The modulus of elasticity of glass fibres prior to heat treatment is $11 \times 10^6$ p.s.i. After heat treatment A the modulus of the glass ceramic fibres is $14 \times 10^6$ p.s.i. and after treatment B the modulus of the glass ceramic fibres is $14.5 \times 10^6$ p.s.i.

The change in relative concentration of alkali metals in glass ceramic fibre produced by treatment B is determined by Flame Photometry in the following manner:

Fibres are immersed in 1% hydrofluoric acid/water solution and slowly dissolve therein at a constant rate. By taking aliquots of the solution at intervals of time and spraying the solution into a gas flame spectra are obtained for the potassium ions measurement of the intensity of which spectra enables the concentration of lithium and potassium at different distances from the surface of the fibres to be determined. The intensity of the spectra is compared with the intensity obtained with standard solutions of varying potassium ion concentration. The results obtained are set out in the Table.

Table

| Distance into the fibre from the surface ($\mu$m) | Li:K ratio |
| --- | --- |
| 0.1 | 1 |
| 0.8 | 2 |
| 1.6 | 5 |
| 3 | 10 |
| 3 | 10 |

If derived, the relative concentration of the alkali metals may be determined by a Radioactive Tracer technique as follows:

The fibres are first irradiated in a reactor in order to produce the radioactive isotope of potassium therein i.e. K$_{42}$. The fibres are then immersed in 2% hydrofluoric acid/water solution. The dissolution rate of glass fibres at this concentration of acid is almost linear with time and fibres dissolve at a rate of 0.8 m per minute. By taking aliquots at varying time intervals it is possible to measure the concentration of potassium ions at various points within the fibre. This is done by monitoring and analysing the radiation emitted by the K$_{42}$ ions in the aliquots of solution. This gives a concentration profile from which the ratio of K$^+$ to Li$^+$ can be calculated for any distance from the fibre surface towards its centre.

EXAMPLE 2

Glass Ceramic Fibre/Tin Composite

A composite is prepared by infiltration with tin of a bundle of fibres held in a mould under vacuum. The mould is immersed in molten tin and a positive gas pressure (20 p.s.i.) of argon or nitrogen is applied over the tin. The molten metal is forced into the mould and infiltrates the fibres, prior to which the fibres are plated with tin to increase the degree of wetting of the fibres by the molten tin. The composite has a strength 3.6 tons per square inch, 50% greater than the strength of the unreinforced metal.

EXAMPLE 3

Glass Ceramic Fibre/Tin Composite

Fibres are first plated with silver by an electroless deposition method in order to make them electrically conducting. They are then electroplated with tin from an alkaline bath comprising potassium stannate after which the coated fibres are hot pressed to compact and produce a composite. The volume fraction of fibre of tin can be varied by controlling the thickness of tin coating. Compaction is conducted in a die at a pressure of 4–5 tons per square inch and at a temperature close to the liquidus of tin.

We claim:

1. A glass ceramic fiber of a diameter no greater than 50 microns having a crystalline interior and a relatively amorphous outer surface layer no greater than 500 A in thickness, said glass ceramic fiber containing a first alkali metal ion wherein the concentration of said first alkali metal ion decreases from the interior of said glass ceramic fiber to the amorphous surface layer, the ratio of total alkali metal ions and silica being maintained constant from said interior to said amorphous surface layer by a second alkali metal ion whose concentration decreases from said amorphous surface layer to said crystalline interior such that there is no interface between said interior and said surface layer.

2. A glass ceramic body according to claim 1 in which lithium is said first alkali metal ion and is the predominant alkali ion in the interior.

3. A glass ceramic body according to claim 1, in which said second alkali metal ion is potassium ion.

4. A glass ceramic body according to claim 3, in which the first alkali metal ion is lithium ion.

5. The glass ceramic fiber of claim 1, wherein the ratio of the first alkali metal ion to the second alkali metal ion in the amorphous outer layer is within 20% of 1 : 1.

* * * * *